United States Patent
Yang et al.

(10) Patent No.: US 9,576,193 B2
(45) Date of Patent: Feb. 21, 2017

(54) GESTURE RECOGNITION METHOD AND GESTURE RECOGNITION APPARATUS USING THE SAME

(71) Applicant: Wistron Corporation, New Taipei (TW)

(72) Inventors: Jie-Ci Yang, New Taipei (TW);
Hui-Chen Lin, New Taipei (TW);
Tzu-Chiang Shen, New Taipei (TW);
Meng-Chao Kao, New Taipei (TW)

(73) Assignee: Wistron Corporation, New Taipei (TW)

( * ) Notice: Subject to any disclaimer, the term of this patent is extended or adjusted under 35 U.S.C. 154(b) by 42 days.

(21) Appl. No.: 14/631,822

(22) Filed: Feb. 25, 2015

(65) Prior Publication Data

US 2016/0140384 A1 May 19, 2016

(30) Foreign Application Priority Data

Nov. 17, 2014 (TW) .............................. 103139764 A

(51) Int. Cl.
*G06F 3/0481* (2013.01)
*G06K 9/00* (2006.01)
(Continued)

(52) U.S. Cl.
CPC ......... *G06K 9/00355* (2013.01); *G06F 3/017* (2013.01); *G06F 3/0304* (2013.01);
(Continued)

(58) Field of Classification Search
CPC .............................. G06F 3/017; G06F 3/30482
See application file for complete search history.

(56) References Cited

U.S. PATENT DOCUMENTS 7,536,034 B2 * 5/2009 Rhoads .................. G06F 3/017
382/107
8,773,352 B1 7/2014 Huang
(Continued)

FOREIGN PATENT DOCUMENTS

CN 103780761 5/2014
TW 201000179 1/2010
(Continued)

OTHER PUBLICATIONS

"Office Action of Taiwan Counterpart Application", issued on Dec. 28, 2015, with English translation thereof, p. 1-p. 19.

*Primary Examiner* — Ricardo L Osorio
(74) *Attorney, Agent, or Firm* — Jianq Chyun IP Office

(57) ABSTRACT

A gesture recognition method and an gesture recognition apparatus using the same method are proposed. The method includes the following steps: transmitting an infrared signal, and detecting whether an object appears in a predetermined range based on a first infrared signal retrieved from the infrared signal being reflected; when the object appears in the predetermined range, capturing a plurality of images including the object and a plurality of second infrared signals retrieved from the infrared signal being reflected; and recognizing the images to retrieve a horizontal movement direction of a gesture of the object within the predetermined range, and recognizing the second infrared signals to retrieve a depth movement direction of the gesture within the predetermined range.

15 Claims, 2 Drawing Sheets

(51) Int. Cl.
*G06F 3/01* (2006.01)
*H04N 5/33* (2006.01)
*G06K 9/20* (2006.01)
*G06F 3/03* (2006.01)
*G06T 7/20* (2006.01)

(52) U.S. Cl.
CPC .......... *G06K 9/2018* (2013.01); *G06T 7/2053* (2013.01); *H04N 5/33* (2013.01); *G06T 2207/10048* (2013.01)

(56) References Cited

U.S. PATENT DOCUMENTS

| | | | |
|---|---|---|---|
| 2014/0201666 A1* | 7/2014 | Bedikian | G06F 3/017 715/771 |
| 2014/0201690 A1* | 7/2014 | Holz | G06F 3/017 715/863 |
| 2016/0117076 A1* | 4/2016 | Kim | G06F 3/0488 715/735 |

FOREIGN PATENT DOCUMENTS

| | | |
|---|---|---|
| TW | 201019241 | 5/2010 |
| TW | 201351308 | 12/2013 |
| TW | M474185 | 3/2014 |

* cited by examiner

GESTURE RECOGNITION METHOD AND GESTURE RECOGNITION APPARATUS USING THE SAME

CROSS-REFERENCE TO RELATED APPLICATION

This application claims the priority benefit of Taiwan application Ser. No. 103139764, filed on Nov. 17, 2014. The entirety of the above-mentioned patent application is hereby incorporated by reference herein and made a part of this specification.

BACKGROUND OF THE INVENTION

Field of the Invention

The invention relates to a recognition method and a gesture recognition apparatus using the same, and more particularly, relates to a gesture recognition method and a gesture recognition apparatus using the same.

Description of Related Art

In recent years, a gesture recognition has become one of main methods used in a human machine interface communication. At present, the proposed gesture recognition methods may be broadly categorized into two methods. In a first method, a computer visual algorithm is mainly used to identify gestures in images captured by an image capturing unit of an electronic apparatus. Such method may be used for a long-range gesture recognition, yet an accuracy rate of the recognition can be easily affected by environment. Further, it requires a higher level hardware to execute highly complex operations of the computer visual algorithm, such that a hardware cost is relatively higher.

In a second method, gestures are recognized mainly by the time difference between the received infrared signals. Although a hardware cost of such method is relatively lower, a gesture recognition rate is limited by operations of users. For instance, when the infrared signals are blocked or interfered, an error rate of the gesture recognition is increased accordingly. Moreover, in addition to a lower extensibility in future applications as compared to the electronic apparatus implementing the first method, a gesture recognition range of the electronic apparatus implementing the second method may also be limited by installation positions of an infrared receiver.

SUMMARY OF THE INVENTION

Accordingly, the invention is directed to a gesture recognition method and an gesture recognition apparatus using the same, which are capable of effectively expanding the gesture recognition range while improving the accuracy rate of the recognition.

The invention provides a gesture recognition method, which is suitable for a gesture recognition apparatus having an image capturing unit. The method includes the following steps: transmitting an infrared signal, and detecting whether an object appears in a predetermined range based on a first infrared signal retrieved from the infrared signal being reflected; when the object appears in the predetermined range, capturing a plurality of images including the object and a plurality of second infrared signals retrieved from the infrared signal being reflected; and recognizing the images to retrieve a horizontal movement direction of a gesture of the object within the predetermined range, and recognizing the second infrared signals to retrieve a depth movement direction of the gesture within the predetermined range.

The invention provides a gesture recognition apparatus, which includes an infrared transmitter, an image capturing unit, a storage unit and a processing unit. The infrared transmitter transmits a plurality of infrared signals. The image capturing unit is configured to receive a first infrared signal, a plurality of second infrared signals and capture a plurality of images. Each of the first infrared signal and the second infrared signals is one of the infrared signals being reflected. The storage unit is configured to store a plurality of modules. The processing unit is connected to the image capturing unit, the infrared transmitter and the storage unit, and configured to access and execute the modules. The modules include a detection module and a recognition module. The detection module detects whether an object appears in a predetermined range based on the first infrared signal. When the object appears in the predetermined range, the recognition module is configured to recognize the images to retrieve a horizontal movement direction of a gesture of the object within the predetermined range, and recognize the second infrared signals to retrieve a depth movement direction of the gesture within the predetermined range.

The invention provides a gesture recognition apparatus, which includes an infrared transmitter, an image capturing unit, an infrared receiver, a storage unit and a processing unit. The infrared transmitter transmits a plurality of infrared signals. The image capturing unit is configured to capture a plurality of images. The infrared receiver receives a first infrared signal and a plurality of second infrared signals. Each of the first infrared signal and the second infrared signals is one of the infrared signals being reflected. The storage unit is configured to store a plurality of modules. The processing unit is connected to the image capturing unit, the infrared transmitter, the infrared receiver and the storage unit, and configured to access and execute the modules. The modules include a detection module and a recognition module. The detection module detects whether an object appears in a predetermined range based on the first infrared signal. The recognition module is configured to recognize the images to retrieve a horizontal movement direction of a gesture of the object within the predetermined range, and recognize the second infrared signals to retrieve a depth movement direction of the gesture within the predetermined range.

Based on the above, after detecting that the objects appears in the predetermined range, the gesture recognition method and the gesture recognition apparatus using the same as proposed by the embodiments of the invention are capable of correspondingly adjusting the image capturing range of the image capturing unit and activating the image capturing function thereof, and recognizing the gesture based on the captured images. Accordingly, with low implementation costs, the recognition range and the accuracy rate of the gesture recognition apparatus may both be effectively improved.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
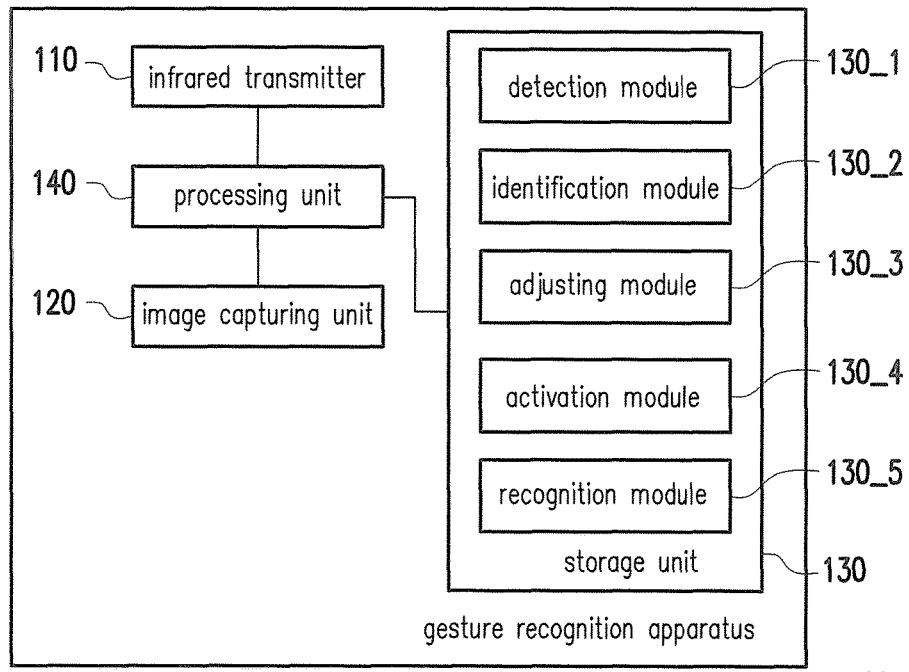
FIG. 1 is a functional block diagram illustrating a gesture recognition apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a functional block diagram illustrating a gesture recognition apparatus according to an embodiment of the invention. In the present embodiment, a gesture recognition apparatus 100 includes an infrared transmitter 110, an image capturing unit 120, a storage unit 130 and a processing unit 140. The infrared transmitter 110 is configured to transmit a plurality of infrared signals. The image capturing unit 120 is, for example, any camera having a charge coupled device (CCD) lens, a complementary metal oxide semiconductor (CMOS) lens or an infrared lens. The image capturing unit 120 may also be an image capturing equipment capable of retrieving depth information, such as a depth camera or a three-dimensional camera. However, possible embodiments of the invention are not limited thereto. In the present embodiment, the image capturing unit 120 may be used to receive the infrared signals being reflected.

The storing unit 130 is, for example, a memory, a hard disk or other devices capable of storing data, and may be used to record a plurality of program codes or data.

The processing unit 140 is connected to the infrared transmitter 110, the image capturing unit 120 and the storage unit 130. The processing unit 140 is, for example, a processor for general purposes, a processor for special purposes, a conventional processor, a data signal processor, a microprocessor, one or more microprocessors, controllers, microcontrollers and Application Specific Integrated Circuit (ASIC) which are combined to a core of the digital signal processor, a Field Programmable Gate Array (FPGA), any other integrated circuits, a state machine, a processor based on Advanced RISC Machine (ARM) and similar products.

In the present embodiment, the processing unit 140 may access the a detection module 130_1, an identification module 130_2, an adjusting module $_{130\_}$3, an activation module 130_4 and a recognition module 130_5 stored in the storage unit 130 in order to execute each step of the gesture recognition method proposed by the invention.

Figure 2:
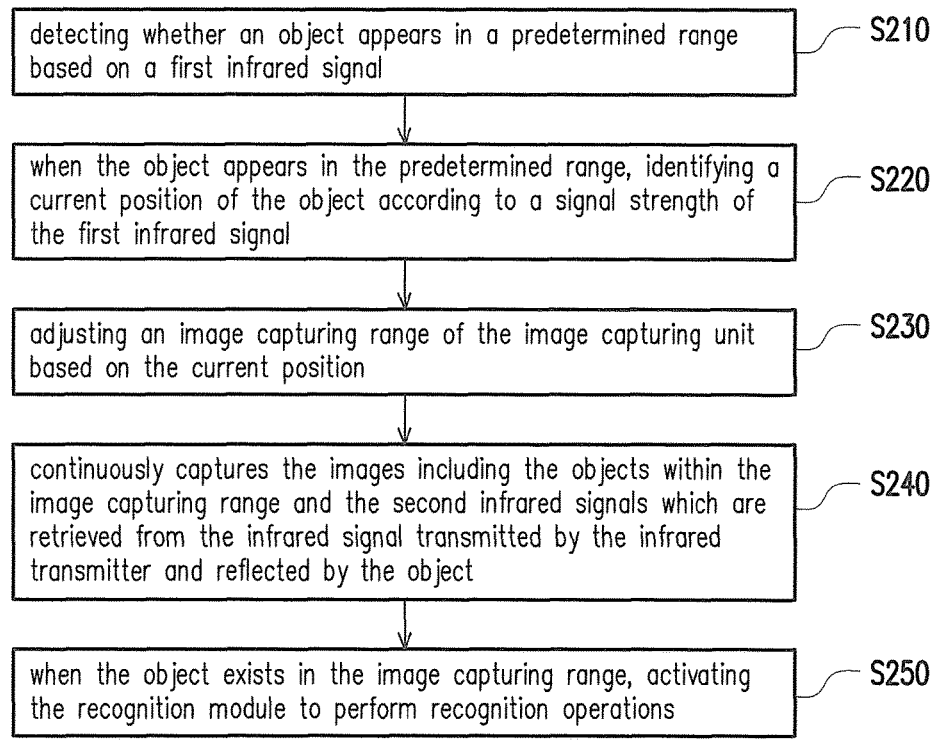
FIG. 2 is a flowchart illustrating a gesture recognition method according to an embodiment of the invention.

FIG. 2 is a flowchart illustrating a gesture recognition method according to an embodiment of the invention. The method proposed by the present embodiment can be executed by the gesture recognition apparatus 100 depicted in FIG. 1, and each steps of the present embodiment is described in detail with reference to each element depicted in FIG. 1.

In step S210, the detection module 130_1 detects whether an object appears in a predetermined range based on a first infrared signal. The first infrared signal is, for example, the reflected infrared signals received by the image capturing unit 120. The predetermined range is, for example, a specific distance (e.g., 50 cm) from the image capturing unit 120, or an image capturing angle range of the image capturing unit 120. When the object appears in the predetermined range, the object changes (e.g., enhances) a signal strength of the first infrared signal, such that the detection module 130_1 may detect that the object appears.

Subsequently, in step S220, when the object appears in the predetermined range, the identification module 130_2 identifies a current position of the object according to the signal strength of the first infrared signal. Further, in step S230, the adjusting module 130_3 adjusts an image capturing range of the image capturing unit 120 based on the current position. A size of the image capturing range may be different based on different resolutions of the image capturing unit 120.

In an embodiment, in the case where the object is a human body, the identification module 130_2 may execute a face recognition mechanism for the human body to recognize a face position. Subsequently, the adjusting module 130_3 may use a reference point (e.g., a center point) in the face position to serve as a data center point of the image capturing range of the image capturing unit 120 in order to adjust an image capturing angle of the image capturing unit. Also, the adjusting module 130_3 may, for example, further include a stepping motor in order to drive the image capturing unit 120 to rotate the image capturing angle thereof for facing right at the reference point. For instance, in the case where the size of the image capturing range is 640×480, the adjusted image capturing range is, for example, one rectangular region using the reference point as the center and having a size of 640×480. However, possible embodiments of the invention are not limited thereto. That is, the gesture recognition apparatus 100 may adaptively move the image capturing range according to the current position of the detected object. Accordingly, a range for users to input the gestures on the gesture recognition apparatus 100 may be effectively expanded without being limited to a specific region.

In step S240, the image capturing unit continuously captures the images including the objects within the image capturing range and the second infrared signals which are retrieved from the infrared signal transmitted by the infrared transmitter 119 and reflected by the object.

Thereafter, in step S250, when the object exists in the image capturing range, the activation module 130_4 activates the recognition module 130_5 to perform recognition operations. That is, the recognition module 130_5 may recognize the gesture within the image capturing range according to the images and a plurality of second infrared signals within the image capturing image range captured by the image capturing unit 120.

In a first embodiment, the recognition module 130_5 may recognize whether the gestures are pushing gestures or pulling gestures in a depth movement direction based on the second infrared signals. Specifically, in the case where the second infrared signals are corresponding to a plurality of time points, the recognition module 130_5 may determine whether an absolute value of a signal strength difference between a $t^{th}$ second infrared signal and a $(t+1)^{th}$ second infrared signal among the second infrared signals is greater than a predetermined threshold, and t is a positive integer.

When the absolute value is greater than the predetermined threshold, the recognition module 130_5 may determine whether a signal strength of the $(t+1)^{th}$ second infrared signal lasts for a predetermined time (e.g., 0.5 sec). If yes, the recognition module 130_5 may determine whether the signal strength of the $(t+1)^{th}$ second infrared signal is greater than a signal strength of the $t^{th}$ second infrared signal. If yes, the recognition module 130_5 may recognize that the gesture is a pushing gesture; and if no, the recognition module 130_5 may recognize that the gesture is a pulling gesture.

In brief, when the absolute value of the signal strength difference between the two consecutive second infrared signals is overly great and this condition lasts for the predetermined time, the recognition module 130_5 may determine that either one pushing gesture or one pulling gesture is detected at the time. Subsequently, the recognition module 130_5 may further determine which one of the two second infrared signals has the signal strength being higher. If the signal strength of the $(t+1)^{th}$ second infrared signal is higher, it is determined that the detected gesture at the time is the pushing gesture, or else it is determined as the pulling gesture.

In a second embodiment, the recognition module 130_5 may recognize whether the gesture moving direction of the gesture is a horizontal movement direction (i.e., upward, downward, leftward or rightward directions) based on the images. Specifically, the recognition module 130_5 may recognize a moving palm appearing in the images, and define a plurality of feature points on the moving palm.

In the present embodiment, when the recognition module 130_5 is recognizing the moving palm appearing in the images, the recognition module 130_5 may build a background model according a principle such as Gaussian mixture model (GMM) based on the images, but the invention is not limited thereto. Subsequently, the recognition module 130_5 may generate a plurality of gray scale images of the images, and a $k^{th}$ gray scale image among the gray scale images is corresponding to a $k^{th}$ image among the images (k is a positive integer). Thereafter, for a $(k+1)^{th}$ gray scale image and the $k^{th}$ gray scale image among the gray scale images, the recognition module 130_5 may subtract the $k^{th}$ gray scale image from the $(k+1)^{th}$ gray scale image to generate a gray scale difference image.

When the moving palm exists in the $(k+1)^{th}$ gray scale image and the $k^{th}$ gray scale image, a feature (e.g., contour, shape, etc.) of the moving palm correspondingly appears in the gray scale difference image. Accordingly, the recognition module 130_5 is capable of finding the moving palm from the gray scale difference image. In other embodiments, when a proportion of the background model occupied by a foreground (e.g., the moving palm) in the images is greater than a predetermined threshold (70%), the recognition module 130_5 may stop recognizing the gesture.

After the moving palm is found, the recognition module 130_5 may define a plurality of feature points (e.g., an angle points, a contour, a scale-invariant feature transform (SIFT) feature points, and/or a speeded-up robust features (SURF) feature point) on the moving palm. However, possible embodiments of the invention are not limited thereto. Subsequently, the recognition module 130_5 may retrieve a plurality of estimated moving distances of the feature points in the images.

For instance, in the case where an $i^{th}$ feature point disappears in the an $n^{th}$ image (i and n are both positive integers) and a moving distance of the $i^{th}$ feature point between $(n-2)^{th}$ and $(n-1)^{th}$ images is Δd (which is an arbitrary real number), the estimated moving distance of the $i^{th}$ feature point in this n number of images may be expressed as n×Δd.

Subsequently, in an embodiment, the recognition module 130_5 may find a plurality of robust feature points from the feature points based on the estimated moving distances. Specifically, when an $i^{th}$ estimated moving distance corresponding to the $i^{th}$ feature point is greater than a predetermined distance threshold, the recognition module 130_5 may define that the $i^{th}$ feature point is one of the robust feature points. After all of the robust feature points are found from the feature points, the recognition module 130_5 may perform subsequent gesture recognition operations based on the robust feature points. Accordingly, negative impacts caused by noises (i.e, the feature points with the estimated moving distance less the predetermined distance threshold) to the subsequent gesture recognition operations may be avoided.

Thereafter, the recognition module 130_5 may retrieve a plurality of movement parameters of each of the robust feature points, and define a plurality of moving directions of the robust feature points according to the movement parameters of each of the robust feature points.

In an embodiment, it is assumed that the movement parameters of a $j^{th}$ (j is a positive integer) robust feature point include a total horizontal movement distance (represented by $D_x$), a total vertical movement distance (represented by $D_y$), a horizontal moving start point (represented by $P_{x1}$) a horizontal moving destination (represented by $P_{xn}$), a vertical moving start point (represented by) and a vertical moving destination (represented by $P_{yn}$) in the images. Under this assumption, when the recognition module 130_5 is determining a $j^{th}$ moving direction corresponding to the $j^{th}$ robust feature point, the recognition module 130_5 may first determine whether $D_x$ is greater than $D_y$. When $D_x$ is greater than $D_y$, the recognition module 130_5 may determine whether $P_{x1}$, is greater than $P_{xn}$. If yes, the recognition module 130_5 may define that the $j_{th}$ moving direction is a leftward direction; and if no, the recognition module 130_5 may define that the $j^{th}$ moving direction is a rightward direction.

On the other hand, when $D_x$ is not greater than $D_y$, the recognition module 130_5 may determine whether $P_{y1}$ is greater than $P_{yn}$. If yes, the recognition module 130_5 may define that the $j^{th}$ moving direction is an upward direction; and if no, the recognition module 130_5 may define that the $j^{th}$ moving direction is a downward direction.

After all of the moving directions of the robust feature points are found by the recognition module 130_5 according to foregoing teachings, the recognition module 130_5 may count an amount of each of the upward direction, the downward direction, the leftward direction and the rightward direction among the moving directions. Further, the recognition module 130_5 may define one direction with a highest amount among the moving directions to serve as the gesture moving direction of the gesture.

Although the first embodiment and the second embodiment of the invention are described separately, persons of ordinary skill in the art should be understood that the first embodiment and the second embodiment may also be operated together in order to accomplish a gesture recognition mechanism with more preferable degrees of freedom.

Figure 3A:
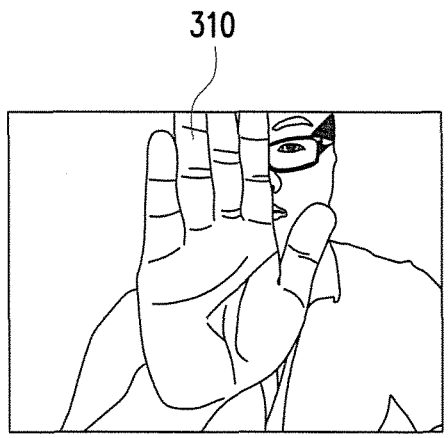
FIG. 3A and FIG. 3B are schematic diagrams illustrating a gesture recognition according to an embodiment of the invention.
Figure 3B:
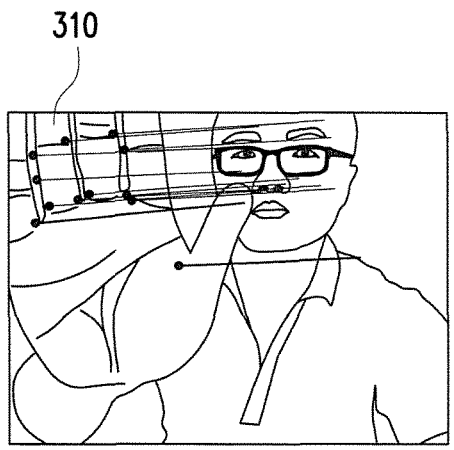

FIG. 3A and FIG. 3B are schematic diagrams illustrating a gesture recognition according to an embodiment of the invention. Referring to FIG. 3A, in the present embodiment, when the user waves in the redetermined range of the gesture recognition apparatus 100 with a palm 310, an image capturing function of the image capturing unit 120 in the gesture recognition apparatus 100 continuously captures an image 300 and adjusts the image capturing range facing the palm 310 when the identification module 130_2 detects that the palm 310 exists, and the recognition module 130_5 is activated by the activation module 130_4.

Subsequently, during a process of moving the palm 310 to a position shown in FIG. 3B by the user, the recognition module 130_5 may determine that the palm 310 is the moving palm according to the images captured during said process, and define the robust feature points (represented by black points) on the palm. Because most of the moving directions of the robust feature points shown in FIG. 3B belong to the leftward directions, the recognition module 130_5 may correspondingly define that the gesture moving direction of the gesture of the user is the leftward direction.

In other embodiments, when the gesture recognition apparatus 100 is disposed on another electronic apparatus (e.g., an advertisement billboard apparatus, a television, etc.), the gesture recognition apparatus 100 may provide recognized information regarding the gesture moving direction to said electronic apparatus, such that the electronic apparatus may perform corresponding operations accordingly. For instance, when the gesture recognition apparatus 100 provides a recognition result in the FIG. 3B to the advertisement billboard apparatus, the advertisement billboard apparatus may correspondingly perform operations such as page turning or scrolling. In addition, when the gesture recognition apparatus 100 determines that the pushing gesture or the pulling gesture are inputted by the user, the advertisement billboard apparatus may correspondingly perform operations such as selecting or exiting.

Figure 4:
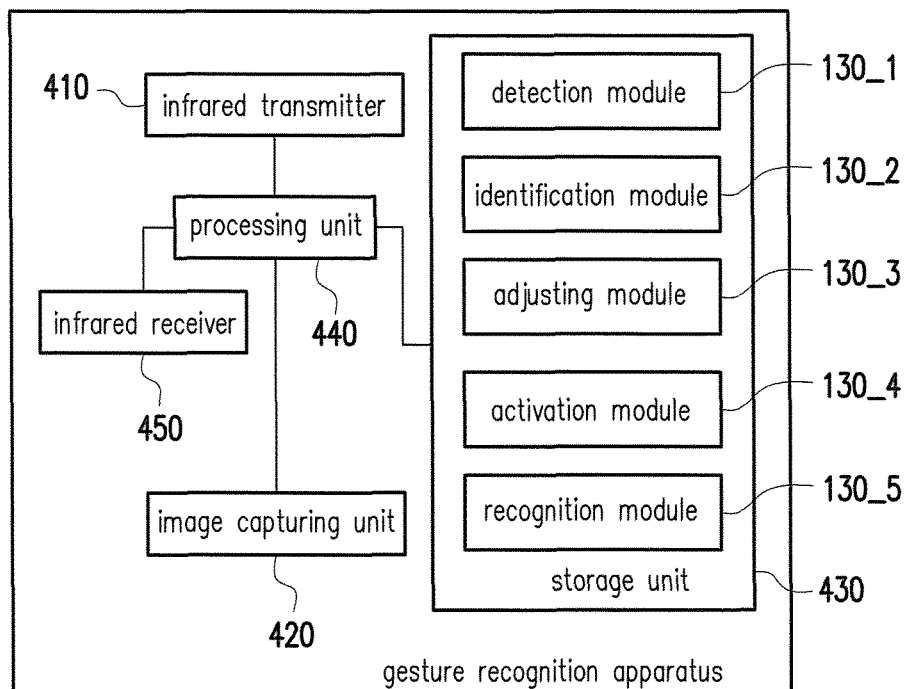
FIG. 4 is a functional block diagram illustrating a gesture recognition apparatus according to an embodiment of the invention.

FIG. 4 is a functional block diagram illustrating a gesture recognition apparatus according to an embodiment of the invention. In the present embodiment, a gesture recognition apparatus 400 includes an infrared transmitter 410, an image capturing unit 420, a storage unit 430, a processing unit 440 and an infrared receiver 450. Details and operation methods regarding the infrared transmitter 410, the image capturing unit 420, the storage unit 430 and the processing unit 440 may refer to related descriptions for the infrared transmitter 110, the image capturing unit 120, the storage unit 130 and the processing unit 140 in FIG. 1, which are not repeated hereinafter.

Unlike FIG. 1, the gesture recognition apparatus 400 further includes the infrared receiver 450, which is connected to the processing unit 440 and configured to receive the second infrared signals being reflected. In other words, the image capturing unit 420 may no longer be responsible for receiving the second infrared signals being reflected, such that the image capturing unit 420 may be activated only when the object is detected in the predetermined range.

More specifically, because the image capturing unit 120 in FIG. 1 is responsible for continuously receiving the images and the second infrared signals being reflected in order to determine whether there is the object entering the predetermined range, power consumptions for systems including the processing unit 140 may be relatively more. However, in the gesture recognition apparatus 400 of FIG. 4, the infrared receiver 450 is responsible for receiving the second infrared signals being reflected, so that the activation module 130_4 may activate the image capturing unit 420 for image capturing operations and activate the recognition module 130_5 for the recognition operations only when the object is detected in the image capturing range. Therefore, before the object within the predetermined range is detected by the gesture recognition apparatus 400, it is not required to activate the image capturing unit 420. Accordingly, a power used by the gesture recognition apparatus 400 may further be saved.

In summary, after the object within the predetermined range is detected through the first infrared signal, the gesture recognition method and the gesture recognition apparatus using the same as proposed by the embodiments of the invention are capable of adjusting the image capturing range of the image capturing unit according to the current position of the object, and activating the image capturing function of the image capturing unit continuously or based on existence of the object being detected. Thereafter, the proposed gesture recognition method and the gesture recognition apparatus using the same may recognize the gesture within the image capturing range according to the second infrared signals and the captured images. Accordingly, limitations to positions or methods for the user to input the gestures may be substantially reduced. Further, because the object is closer to the gesture recognition apparatus, affections from the environment to the subsequently gesture recognition mechanism may be lowered in order to improve the accuracy rate of the gesture recognition.

Although the present disclosure has been described with reference to the above embodiments, it will be apparent to one of ordinary skill in the art that modifications to the described embodiments may be made without departing from the spirit of the present disclosure. Accordingly, the scope of the present disclosure will be defined by the attached claims and not by the above detailed descriptions.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A gesture recognition method, suitable for a gesture recognition apparatus having an image capturing unit, and comprising:
   transmitting an infrared signal, and detecting whether an object appears in a predetermined range based on a first infrared signal retrieved from the infrared signal being reflected;
   when the object appears in the predetermined range, identifying a current position of the object according to a signal strength of the first infrared signal;
   adjusting an image capturing range to face the object based on the current position to capture a plurality of images including the object and a plurality of second infrared signals retrieved from the infrared signal being reflected; and
   recognizing the images to retrieve a horizontal movement direction of a gesture of the object within the predetermined range, and recognizing the second infrared signals to retrieve a depth movement direction of the gesture within the predetermined range.

2. The gesture recognition method of claim 1, wherein the object is a human body, and the step of adjusting the image capturing range to face the object based on the current position to capture the plurality of images including the object and the plurality of second infrared signals retrieved from the infrared signal being reflected comprises:
   executing a face recognition mechanism for the human body to recognize a face position; and
   using a reference point in the face position to serve as a data center point of the image capturing range.

3. The gesture recognition method of claim 1, wherein the step of recognizing the second infrared signals to retrieve a depth movement direction of the gesture within the predetermined range comprises:
   determining whether an absolute value of a signal strength difference between a $t^{th}$ second infrared signal and a $(t+1)^{th}$ second infrared signal among the second infrared signals is greater than a predetermined threshold;

when the absolute value is greater than the predetermined threshold, determining whether a signal strength of the $(t+1)^{th}$ second infrared signal lasts for a predetermined time;

when the signal strength of the $(t+1)^{th}$ second infrared signal lasts for the predetermined time, determining whether the signal strength of the $(t+1)^{th}$ second infrared signal is greater than a signal strength of the $t^{th}$ second infrared signal;

if yes, recognizing that the gesture is a pushing gesture; and if no, recognizing that the gesture is a pulling gesture.

4. The gesture recognition method of claim 1, wherein the step of recognizing the images to retrieve the horizontal movement direction of the gesture of the object within the predetermined range comprises:

recognizing a moving palm appearing in the images, and defining a plurality of feature points on the moving palm;

retrieving a plurality of estimated moving distances of the feature points in the images;

finding a plurality of robust feature points from the feature points based on the estimated moving distances;

retrieving a plurality of movement parameters of each of the robust feature points in the images;

defining a plurality of moving directions of the robust feature points according to the movement parameters of each of the robust feature points; and deciding a gesture moving direction of the gesture according to the moving directions of the robust feature points.

5. The gesture recognition method of claim 4, wherein and the step of recognizing the moving palm appearing in the images comprises:

building a background model based on the images;

generating a plurality of gray scale images of the images, wherein a $k^{th}$ gray scale image among the gray scale images is corresponding to a $k^{th}$ image among the images;

for a $(k+1)^{th}$ gray scale image and the $k^{th}$ gray scale image, subtracting the $k^{th}$ gray scale image from the $(k+1)^{th}$ gray scale image to generate a gray scale difference image; and finding the moving palm from the gray scale difference image.

6. The gesture recognition method of claim 5, further comprising:

when a proportion of the background model occupied by a foreground in the images is greater than a predetermined threshold, stopping recognizing the gesture.

7. The gesture recognition method of claim 4, wherein an $i^{th}$ feature point among the feature points is corresponding to an $i^{th}$ estimated moving distance among the estimated moving distances, and the step of finding the robust feature points from the feature points based on the estimated moving distances comprises:

when the $i^{th}$ estimated moving distance is greater than a predetermined distance threshold, defining that the $i^{th}$ feature point is one of the robust feature points.

8. The gesture recognition method of claim 4, wherein the movement parameters of a $j^{th}$ robust feature point among the robust feature points comprises a total horizontal movement distance, a total vertical movement distance, a horizontal moving start point, a horizontal moving destination, a vertical moving start point and a vertical moving destination in the images, and the $j^{th}$ robust feature point is corresponding to a $j^{th}$ moving direction among the moving directions, wherein the step of defining the moving directions of the robust feature points according to the movement parameters of each of the robust feature points comprises:

for the $j^{th}$ robust feature point, determining whether the total horizontal movement distance is greater than the total vertical movement distance;

when the total horizontal movement distance is greater than the total vertical movement distance, determining whether the horizontal moving start point is greater than the horizontal moving destination;

if yes, defining that the $j^{th}$ moving direction is a leftward direction;

if no, defining that the $j^{th}$ moving direction is a rightward direction;

when the total horizontal movement distance is not greater than the total vertical movement distance, determining whether the vertical moving start point is greater than the vertical moving destination;

if yes, defining that the $j^{th}$ moving direction is an upward direction; and if no, defining that the $j^{th}$ moving direction is a downward direction.

9. The gesture recognition method of claim 8, wherein the step of deciding the gesture moving direction of the gesture according to the moving directions of the robust feature points comprises:

counting an amount of each of the upward direction, the downward direction, the leftward direction and the rightward direction among the moving directions; and defining the moving direction with a highest amount among the moving directions is the gesture moving direction of the gesture.

10. The gesture recognition method of claim 1, wherein the gesture recognition apparatus comprises an infrared transmitter for transmitting the infrared signal and the image capturing unit for continuously capturing the images and the second infrared signals, and the step of recognizing the images and the second infrared signals is performed only when detecting that the object appears in the predetermined range.

11. The gesture recognition method of claim 1, wherein the gesture recognition apparatus comprises an infrared transmitter for transmitting the infrared signal, an infrared receiver for receiving the first infrared signal and the second infrared signals, and the image capturing unit for capturing the images and the second infrared signals, and the image capturing unit is activated to capture the images and the second infrared signals only when detecting that the object appears in the predetermined range.

12. A gesture recognition apparatus, comprising:

an infrared transmitter, transmitting a plurality of infrared signals;

an image capturing unit, configured to receive a first infrared signal, a plurality of second infrared signals and capture a plurality of images, wherein each of the first infrared signal and the second infrared signals is one of the infrared signals being reflected;

a storage unit, storing a plurality of modules; and a processing unit, connected to the image capturing unit, the infrared transmitter and the storage unit, accessing and executing the modules, and the modules comprising:

a detection module, detecting whether an object appears in a predetermined range based on the first infrared signal;

an identification module, identifying a current position of the object according to a signal strength of the first infrared signal when the object appears in the predetermined range;

an adjusting module, adjusting an image capturing range of the image capturing unit to face the object for the image capturing unit to capture the images and the second infrared signals including the object; and a recognition module, configured to recognize the images to retrieve a horizontal movement direction of a gesture of the object within the predetermined range, and recognize the second infrared signals to retrieve a depth movement direction of the gesture within the predetermined range.

13. The gesture recognition apparatus of claim 12, wherein the modules further comprising:

an activation module, configured to activate the identification module to recognize the images and the second infrared signals only when detecting that object exists in the predetermined range.

14. A gesture recognition apparatus, comprising:

an infrared transmitter, transmitting a plurality of infrared signals;

an image capturing unit, configured to capture a plurality of images;

an infrared receiver, receiving a first infrared signal and a plurality of second infrared signals, wherein each of the first infrared signal and the second infrared signals is one of the infrared signals being reflected;

a storage unit, storing a plurality of modules; and a processing unit, connected to the image capturing unit, the infrared transmitter, the infrared receiver and the storage unit, accessing and executing the modules, and the modules comprising:

a detection module, detecting whether an object appears in a predetermined range based on the first infrared signal;

an identification module, identifying a current position of the object according to a signal strength of the first infrared signal when the object appears in the predetermined range;

an adjusting module, adjusting an image capturing range of the image capturing unit to face the object for the image capturing unit to capture the images and the second infrared signals including the object; and a recognition module, configured to recognize the images to retrieve a horizontal movement direction of a gesture of the object within the predetermined range, and recognize the second infrared signals to retrieve a depth movement direction of the gesture within the predetermined range.

15. The gesture recognition apparatus of claim 14, wherein the modules further comprising:

an activation module, configured to activate the image capturing module to capture the images only when detecting that the object exists in the predetermined range.

* * * * *